UNITED STATES PATENT OFFICE.

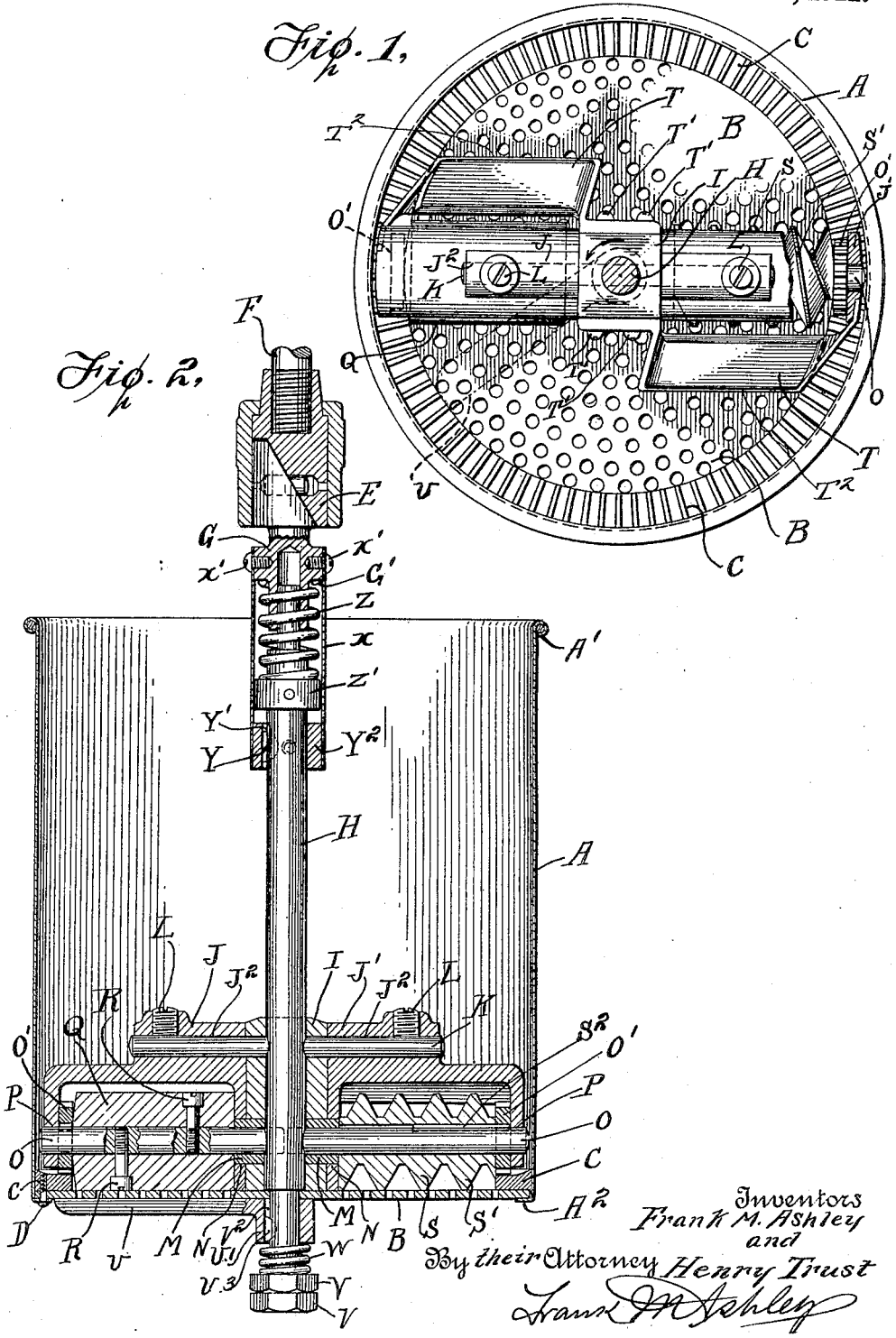

HENRY TRUST, OF PARK RIDGE, NEW JERSEY, AND FRANK M. ASHLEY, OF BROOKLYN, NEW YORK.

MIXING AND BEATING MACHINE.

1,402,914.   Specification of Letters Patent.   Patented Jan. 10, 1922.

Application filed April 3, 1920. Serial No. 370,938.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Mixing and Beating Machines, of which the following is a specification.

Our invention relates to mixing and beating machines and the object of our invention is to provide a combined cutting and mashing apparatus for treating potatoes and other such vegetables.

Referring to the drawings which form a part of this specification:

Figure 1 is a plan view, and

Figure 2 is a vertical sectional view of a construction embodying our invention.

A indicates a casing which is adapted to be suspended from its beaded edge A' and its lower end A² is turned inward to form a seat for the disc strainer B. A circular rack C is held in position together with the disc B by a set of screws D spaced about its periphery. E indicates a coupling which connects the driving shaft F and shank member G together in separable relation. H indicates the driven shaft, hereinafter referred to as the spindle, and to which is firmly attached a sleeve I preferably formed square in cross section as illustrated in Figure 1. J and J' indicate frames carried by the spindle H by means of a cross rod K which extends through and snugly fits in the openings J²—J² as illustrated, and held in position by the set screws L—L respectively. M—M respectively are bushings fitted into openings formed in the sleeve I and extending into openings N—N respectively, formed in the inner ends of the frames J and J' respectively, thereby serving to prevent the said frames from swinging on the rod J², and also serving as bearings for the shafts O—O respectively which extend through same into openings in the spindle H which are clearly indicated in dotted lines and which further serve as bearings for the ends of the shafts O—O. The opposite ends of the shafts O—O are fitted in the bearings P—P respectively, formed in the outer ends of the frames. Mounted on each of the shafts O—O near its outer end is a spur gear wheel O' which meshes with the teeth of the rack C and drives the said shafts when the spindle H is rotated. A roller Q is mounted on one of the shafts O and is secured thereto by the screws R—R as shown. A roller S having a coarse worm thread S' formed thereon as illustrated, is mounted on the other shaft O and is driven through a feather key S² which is fitted in a key-way formed in the shaft, the said feather also extending through the gear wheel O' as shown, and therefore when the shaft H is rotated the rollers are turned with their respective shafts O—O through the instrumentality of the spur gears and rack. Connected to the sleeve I by screws T'—T', etc., are scrapers T—T respectively, the edges T² of which contact with the top of the disc B and lift any material not forced through the perforations of the strainer and spreads it in the path of the following roller. Provision is made to permit the spindle H to be lifted together with the attached rollers in case a small stone or other obstacle should accidently get into the receptacle and under a roller, as follows: A scraper U having a hub U' is provided with a key-way U² and a key-way U³ is carried by the shaft H and is adapted to slidingly fit in said key-way. This scraper U is held in contact with the under side of the perforated disc B by the jam nuts V—V' respectively between which and the hub U' is interposed a helical spring W of sufficient strength to hold the scraper in proper contact with the said disc and having sufficient space between the convolutions to permit the spindle H to rise a predetermined distance. The spindle H is connected to the shank member G by a casing X which is connected to the shank member G by screws X'—X', etc., and to hold the spindle by a key Y which is seated in the spindle as illustrated and fits into a key-way Y' formed in the ring Y² connected to the casing X. Z indicates a helical spring interposed between the spindle H and shank G, through which the required pressure is exerted upon the rollers Q and S. The ring Z' is fastened to the spindle H and abuts the lower end of the spring X and the upper end of the spring rests against the shoulder G' of the shank G.

Assuming the spindle H to be rotating in the direction indicated by the arrow in Figure 1, the roller Q and roller S are carried in a circular path by the frame J. The gear wheels O' respectively being geared in the rack C are caused to rotate. The roller S serves to cut and scrape the material to be mashed, the scraping action being due to the pitch of the thread formed in the roller S, which serves to bring the ingredients toward the center of the container A which is normally thrown outward to the sides of the container due to the centrifugal action caused by the rotation of the frame J, while the roller Q further crushes the material and forces it through the perforations in the bottom disk, at which point the scraper V acts to cut the material from the disk in case it should stick thereto.

By reason of the rack C being placed at the outer periphery of the disk B the frame as a whole is supported in a smooth working manner.

In case any hard lump, such as a pebble should get into the container during the mashing operation, the rolls and frame are lifted against the action of the spring Z to prevent injury to the device.

Many changes in details of construction may be made and we do not wish to be confined to the exact details shown except as defined in the claims.

Having thus described our invention, we claim as new and desire to secure by Letters Patent:

1. A mashing and straining machine comprising a casing having a perforated plate supported at its lower end, a spindle, a frame carried by said spindle and a roller carried by said frame and supported at both ends thereby, a gear wheel connected to said roller adjacent its outer end and a rack held by said casing and meshing with said gear wheel.

2. A mashing and straining machine comprising a casing having a perforated plate supported at its lower end, a spindle, two rollers carried by said frame and arranged in alignment with each other and supported at both ends thereby, a gear wheel connected to each roller at its outer end and a rack meshing with said gear wheels.

3. A mashing and straining machine comprising a casing, a perforated plate supported at the lower end thereof, a spindle, a plain roller and a roller having a coarse pitch thread or worm formed in its surface and located in alignment with said plain roller and both carried by said spindle.

4. A mashing and straining machine comprising a casing having a perforated plate supported at its lower end, a spindle, a frame carried by said spindle and a roller carried by said frame and supported at both ends thereby and a scraper carried by said frame behind and below said roller.

5. A mashing and straining machine comprising a casing having a perforated plate supported at its lower end, a spindle, a frame carried by said spindle and a roller having a coarse thread formed in its surface, carried by said frame and supported at both ends thereby, said spindle having a shank and a spring carried by said spindle and interposed between said frame and shank to permit relative vertical movement.

Signed at New York city, in the county of New York and State of New York, this 9th day of February, A. D. 1920.

HENRY TRUST.
FRANK M. ASHLEY.